Nov. 22, 1938.  F. D. MATTHEWS  2,137,921
ELECTRIC MOTOR AND SUPPORT THEREFOR
Filed July 15, 1938
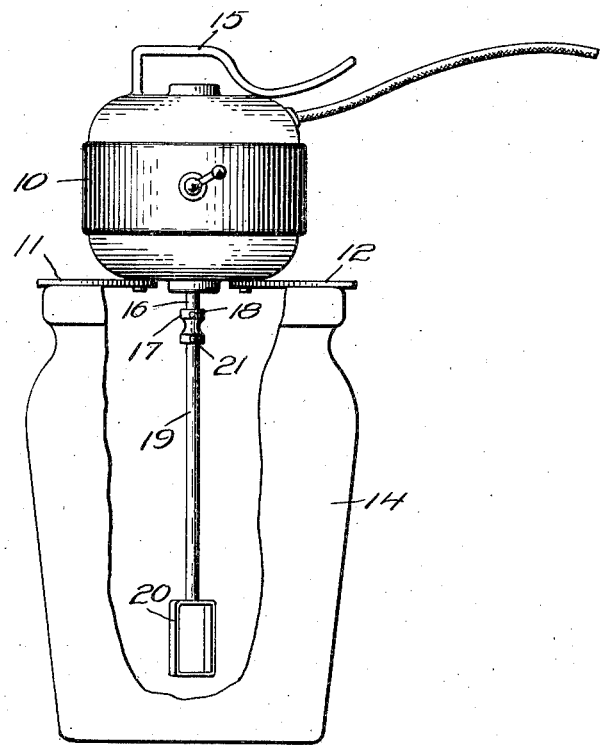
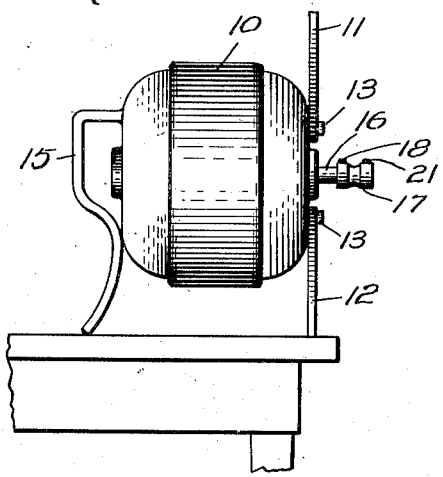
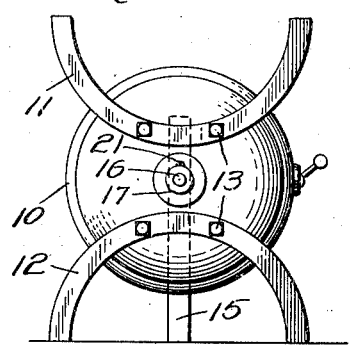
Fred D. Matthews  INVENTOR
BY Victor J. Evans & Co.
ATTORNEYS Patented Nov. 22, 1938

2,137,921

UNITED STATES PATENT OFFICE 2,137,921

ELECTRIC MOTOR AND SUPPORT THEREFOR

Fred D. Matthews, Albertville, Ala.

Application July 15, 1938, Serial No. 219,480

2 Claims. (Cl. 248—2)

This invention relates to an electric motor and support therefor and has for an object to provide a motor provided with laterally extending members at one end of the housing and a handle at the other end of the housing so that the motor may be applied in vertical position to a container with the members supporting the motor on the container or the motor may be used in horizontal position for many purposes in which position the members form front legs and the handles form the rear leg, that is, a three point support for the motor.

A further object is to provide a device of this character which will be formed of a few strong simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming part of this specification,

Figure 1 is a front elevation, with portions broken away, showing the motor equipped with a handle and diverging laterally extending members according to the invention, supported upon a container.

Figure 2 is a side elevation of the motor supported in horizontal position, on a table or like support through the medium of the arcuate members and the handle forming a three point support.

Figure 3 is a front elevation of the parts shown in Figure 2.

Referring now to the drawing in which like characters of reference designate similar parts in the various views, 10 designates a conventional electric motor. In carrying out the invention a pair of arcuate divergent laterally extending members 11 and 12, best shown in Figure 3, are secured to the front of the motor housing by screws 13 or other connectors. When the motor is used as a stirrer, in vertical position, the members 11 and 12 extend over the edges of the receptacle 14, as best shown in Figure 1, and support the motor.

At the rear end of the housing, a handle member 15 is provided, the handle member extending from one side of the housing at a point between the arcuate members, as best shown in Figure 3, and extends from the housing an equal distance with the arcuate members, whereby, when the motor is used in a horizontal position for various purposes the extending end of the handle at one end thereof and the arcuate members at the opposite ends thereof form legs, or a three point support for the motor.

The arcuate members 11 and 12 and the handle 15 may all be formed of inexpensive strap metal or other material.

The shaft 16 of the motor is equipped with a grooved pulley 17 which is secured to the shaft through the medium of a set screw 18. The pulley is provided with a counter-bore in which the stem 19 of an agitator 20 may be secured through the medium of a set screw 21. When the device is used in horizontal position as shown in Figure 2, various types of apparatus may be driven from the pulley through the medium of a belt drive, not shown.

From the above description it is thought that the construction and operation of the invention will be fully understood without further explanation.

What is claimed is:

1. The combination with a motor having a housing, of arcuate divergent laterally extending members connected to and projecting beyond the housing at one end thereof, said members being adapted to support the motor upon a receptacle in vertical position so that the motor may be used as a mixing motor, and a handle member mounted upon and extending from the other end of the housing and projecting from the housing to a point midway between the ends of one of the arcuate members so that when the motor is used in horizontal position the handle and said ends of the last named member form a three point support for the motor.

2. The combination with an electric motor having a housing, of a pair of arcuate divergent laterally extending members fixed to one end of the housing and extending beyond the housing to form a support for mounting the motor in vertical position, and a handle fixed to the other end of the housing, said handle being formed of strap material bent to provide a grip and having a central portion projecting beyond the grip to the plane of the ends of one of said arcuate members so that the handle and said ends of the last named arcuate member constitute a three point support for mounting the motor in horizontal position.

FRED D. MATTHEWS.